(12) United States Patent
Sakai et al.

(10) Patent No.: US 12,139,805 B2
(45) Date of Patent: Nov. 12, 2024

(54) HYDROGEN SYSTEM

(71) Applicant: Panasonic Intellectual Property Management Co., Ltd., Osaka (JP)

(72) Inventors: Osamu Sakai, Osaka (JP); Hidenobu Wakita, Kyoto (JP); Atsuo Okaichi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 559 days.

(21) Appl. No.: 17/368,993

(22) Filed: Jul. 7, 2021

(65) Prior Publication Data

US 2021/0332488 A1    Oct. 28, 2021

Related U.S. Application Data

(63) Continuation of application No. PCT/JP2020/009170, filed on Mar. 4, 2020.

(30) Foreign Application Priority Data

May 14, 2019 (JP) .................................. 2019-091564
Jan. 27, 2020 (JP) .................................. 2020-010889

(51) Int. Cl.
C25B 9/67 (2021.01)
C01B 3/38 (2006.01)
(Continued)

(52) U.S. Cl.
CPC .................. C25B 9/67 (2021.01); C01B 3/38 (2013.01); C25B 1/04 (2013.01);
(Continued)

(58) Field of Classification Search
None
See application file for complete search history.

(56) References Cited

U.S. PATENT DOCUMENTS

| 4,829,785 A * | 5/1989 | Hersey ............... H01M 8/0656 62/335 |
| 2011/0217601 A1 | 9/2011 | Usami et al. |
| 2017/0284685 A1* | 10/2017 | Bahar ................... F24F 3/1417 |

FOREIGN PATENT DOCUMENTS

| CN | 101971401 A | 2/2011 |
| JP | 2011-100610 | 5/2011 |
| JP | 2015-117139 | 6/2015 |

OTHER PUBLICATIONS

International Search Report of PCT application No. PCT/JP2020/009170 dated Jun. 9, 2020.
(Continued)

*Primary Examiner* — Louis J Rufo
(74) *Attorney, Agent, or Firm* — Rimon P.C.

(57) ABSTRACT

A hydrogen system includes a compressor that includes an electrolyte membrane, an anode on a first primary surface of the electrolyte membrane, a cathode on a second primary surface of the electrolyte membrane, and a voltage applicator that applies a voltage between the anode and the cathode, the compressor producing compressed hydrogen by causing the voltage applicator to apply a voltage between the anode and the cathode to move hydrogen in hydrogen-containing-gas containing steam supplied to the anode to the cathode via the electrolyte membrane; a supply path through which the hydrogen-containing-gas containing steam to be supplied to the anode flows; a cooling mechanism disposed in the supply path; and a heat exchanger disposed in the supply path, the heat exchanger exchanging heat between the hydrogen-containing-gas flowing through the supply path upstream of the cooling mechanism and the hydrogen-containing-gas flowing through the supply path downstream of the cooling mechanism.

9 Claims, 7 Drawing Sheets

(51) Int. Cl.
*C25B 1/04* (2021.01)
*H01M 8/04007* (2016.01)
*H01M 8/0656* (2016.01)

(52) U.S. Cl.
CPC ..... *H01M 8/04067* (2013.01); *H01M 8/0656* (2013.01); *C01B 2203/0233* (2013.01); *C01B 2203/0244* (2013.01); *H01M 2250/20* (2013.01)

(56) References Cited

OTHER PUBLICATIONS

English Translation of Chinese Search Report dated Nov. 11, 2023 for the related Chinese Patent Application No. 202080006213.9.

* cited by examiner

HYDROGEN SYSTEM

BACKGROUND

1. Technical Field

The present disclosure relates to a hydrogen system.

2. Description of the Related Art

In recent years, hydrogen has been attracting attention as a clean alternative energy source to replace fossil fuels against a background of environmental problems, such as global warming, and energy issues, such as the depletion of petroleum resources. When burnt, basically, hydrogen only releases water, with zero emissions of carbon dioxide, which causes global warming, and almost zero emissions of substances like nitrogen oxides, and this is why it is hoped that hydrogen will serve as clean energy.

An example of a device that efficiently uses hydrogen as a fuel is fuel cells. The development and popularization of fuel cells are ongoing for automotive power supply and household power generation applications.

In the forthcoming hydrogen society, technologies will need to be developed with which not only can hydrogen be produced, but also hydrogen can be stored at high density and transported or used in small volumes at low cost. In particular, further popularization of fuel cells requires preparing an infrastructure for the supply of hydrogen, and many proposals have been made concerning the production, purification, and high-density storage of high-purity hydrogen to ensure a stable supply of hydrogen.

For example, Japanese Unexamined Patent Application Publication No. 2015-117139 proposes a device that produces high-purity hydrogen by purifying and pressurizing hydrogen present in a hydrogen-containing gas through the application of a voltage between an anode and a cathode with an electrolyte membrane therebetween.

With such an electrolyte membrane-based, or electrochemical, hydrogen compressor, hydrogen systems can be built that are less power-consuming and more efficient than with a mechanical hydrogen compressor.

SUMMARY

One non-limiting and exemplary embodiment provides a hydrogen system that can make hydrogen compression by a compressor more efficient than it is now.

In one general aspect, the techniques disclosed here feature a hydrogen system. The hydrogen system includes a compressor that includes an electrolyte membrane, an anode on a first primary surface of the electrolyte membrane, a cathode on a second primary surface of the electrolyte membrane, and a voltage applicator that applies a voltage between the anode and the cathode, the compressor producing compressed hydrogen by causing the voltage applicator to apply a voltage between the anode and the cathode to move hydrogen in hydrogen-containing gas containing steam supplied to the anode to the cathode via the electrolyte membrane; a supply path through which the hydrogen-containing gas containing steam to be supplied to the anode flows; a cooling mechanism disposed in the supply path; and a heat exchanger disposed in the supply path, the heat exchanger exchanging heat between the hydrogen-containing gas flowing through the supply path upstream of the cooling mechanism and the hydrogen-containing gas flowing through the supply path downstream of the cooling mechanism.

The hydrogen system according to an aspect of the present disclosure is advantageous in that it can make hydrogen compression by a compressor more efficient than it is now.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
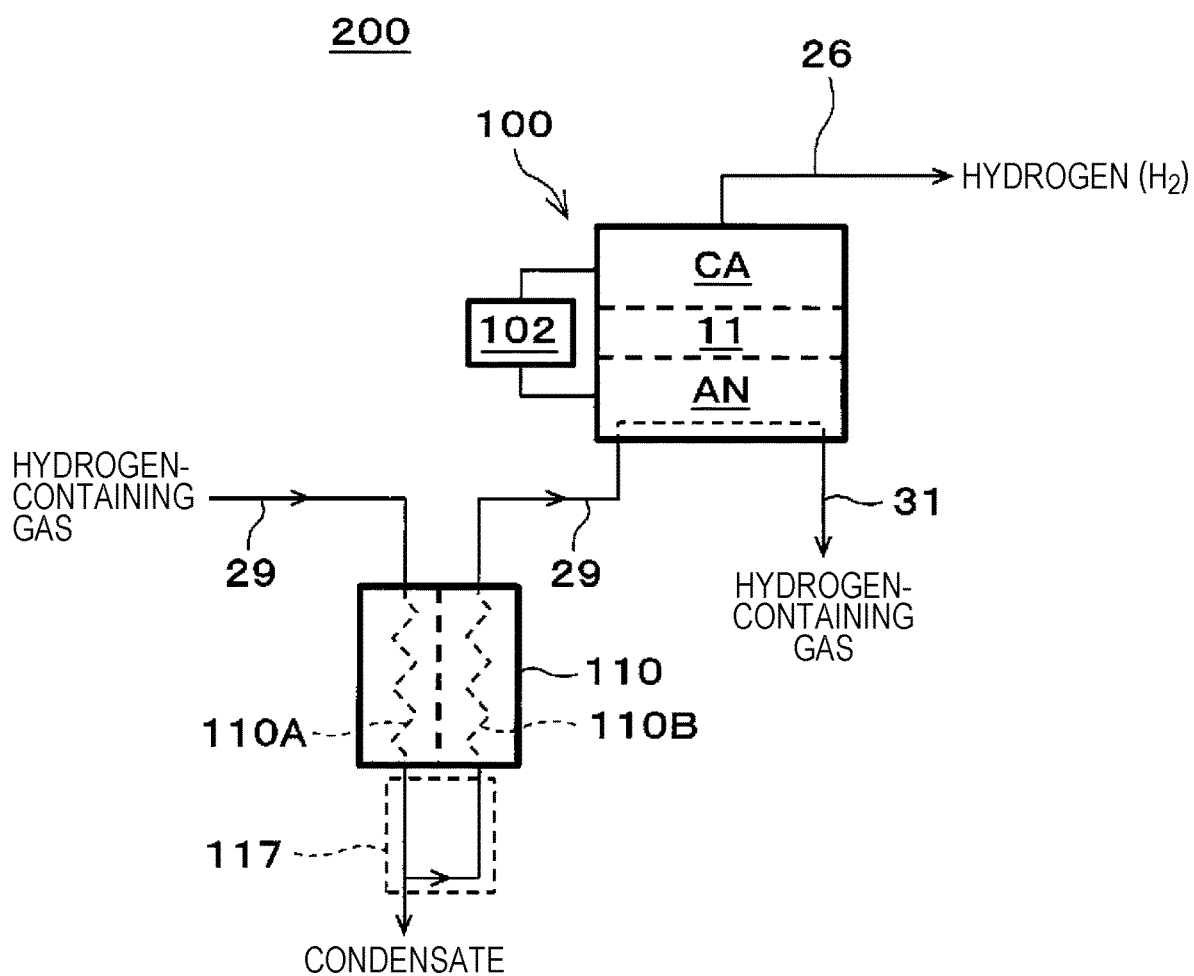
FIG. 1 is a diagram illustrating an example of a hydrogen system according to Embodiment 1.

An electrolyte membrane-based, or electrochemical, hydrogen compressor has varying performance in electrochemical hydrogen compression depending on the moistness of its electrolyte membrane. For example, an electrochemical hydrogen compressor has a cell including an electrolyte membrane, an anode, and a cathode and produces high-pressure hydrogen by separating hydrogen ($H_2$) present in a hydrogen-containing gas supplied to the anode into protons, transferring the protons to the cathode, and recombining the protons ($H^+$) into hydrogen ($H_2$) at the cathode. In this process, the electrolyte membrane generally becomes highly proton-conductive under hot and heavily humidified conditions, and the electrochemical hydrogen compressor becomes more efficient in hydrogen compression under such conditions.

As such, an electrochemical hydrogen compressor needs to be designed to withstand the pressure of high-pressure hydrogen. The cell, therefore, is often covered, for example with a thick and rigid metal component. If the compressor has a stack of multiple cells, heating the stack with any suitable heat source requires giving a desired amount of energy to the heat source. At start-up, for example, the heat source consumes more energy because the temperature of the electrochemical hydrogen compressor is usually equal to room temperature.

The performance of an electrochemical hydrogen compressor in electrochemical hydrogen compression also depends on the state of condensate in the cell in the electrochemical hydrogen compressor. For example, if the anode is supplied with a hydrogen-containing gas obtained through water electrolysis, a reformed gas obtained by reforming of a hydrocarbon feedstock, etc., these hydrogen-containing gases are produced in a hot and heavily humidified state with a dew point of approximately 80° C.

If it is assumed that the hydrogen-containing gas supplied to the anode is too humid for the temperature of the cell in the electrochemical hydrogen compressor, the steam in the hydrogen-containing gas condensates at the anode, and the resulting condensate can block gas flow channels in the electrochemical hydrogen compressor (flooding). At start-up, for example, the temperature of the electrochemical hydrogen compressor is usually equal to room temperature. Supplying a heavily humidified hydrogen-containing gas, which has a high dew point compared with room temperature, to the anode in that state, therefore, probably results in flooding at the anode. The diffusion of hydrogen in the electrochemical hydrogen compressor is therefore easily inhibited. The electricity demand for hydrogen compression, or for the desired extent of proton movement, is increased, affecting the efficiency of hydrogen compression by the electrochemical hydrogen compressor.

After studying these problems extensively, the inventors conceived the idea of providing a heat exchanger and a cooling mechanism for collecting latent heat in the supply path through which the hydrogen-containing gas flows to be supplied to the anode.

That is, a hydrogen system according to a first aspect of the present disclosure includes:

- a compressor that includes an electrolyte membrane, an anode on a first primary surface of the electrolyte membrane, a cathode on a second primary surface of the electrolyte membrane, and a voltage applicator that applies a voltage between the anode and the cathode, the compressor producing compressed hydrogen by causing the voltage applicator to apply a voltage between the anode and the cathode to move hydrogen in hydrogen-containing gas containing steam supplied to the anode to the cathode via the electrolyte membrane;
- a supply path through which the hydrogen-containing gas containing steam to be supplied to the anode flows;
- a cooling mechanism disposed in the supply path; and
- a heat exchanger disposed in the supply path, the heat exchanger exchanging heat between the hydrogen-containing gas flowing through the supply path upstream of the cooling mechanism and the hydrogen-containing gas flowing through the supply path downstream of the cooling mechanism.

Configured as such, the hydrogen system according to this aspect can make hydrogen compression by a compressor more efficient than it is now.

Specifically, if the hydrogen-containing gas supplied to the anode is too humid for the temperature of the cell in the compressor, the steam in the hydrogen-containing gas condenses at the anode, and the resulting condensate can cause flooding in gas flow channels in the compressor. The hydrogen system according to this aspect, however, has a heat exchanger and a cooling mechanism in the supply path through which the hydrogen-containing gas flows to be supplied to the anode. The hydrogen-containing gas supplied to the anode is dehumidified at the heat exchanger and the cooling mechanism, and this helps control the humidity of the hydrogen-containing gas to a level appropriate for the temperature of the cell in the compressor. This reduces the risk of flooding at the anode, and, as a result, the hydrogen system according to this aspect achieves improved efficiency of hydrogen compression by the compressor.

In addition, the steam in the hydrogen-containing gas flowing through the supply path upstream of the cooling mechanism produces latent heat when condensing, but the hydrogen system according to this aspect collects this latent heat at the heat exchanger into the hydrogen-containing gas flowing downstream of the cooling mechanism in the supply path, allowing the latent heat to be used effectively to heat the cell in the compressor. This ensures the cell is heated to its desired temperature effectively, and, as a result, the hydrogen system according to this aspect achieves improved efficiency of hydrogen compression by the compressor. The hydrogen system according to this aspect, therefore, requires no electric heater or similar heat source, for example, to heat the cell in the compressor. Even if it is assumed that such a heat source is used, furthermore, the required power of the heat source is lower.

A hydrogen system according to a second aspect of the present disclosure is: In the first aspect, the hydrogen system may include a bypass path that branches from the supply path, bypasses the heat exchanger, and then joins the supply path.

As stated, the hydrogen source for the compressor is a hot and humid hydrogen-containing gas produced by water electrolysis or a hot and humid hydrogen-containing gas produced by reforming of a hydrocarbon feedstock for example, and such a gas is used as anode gas for the compressor. This means a hot and humid hydrogen-containing gas with a dew point of approximately 80° C. is supplied to the anode of the cell in the compressor.

If the hydrogen-containing gas supplied to the anode is too humid for the temperature of the cell in the compressor in that case, the steam condenses at the anode, and the resulting condensate can cause flooding at the anode. If the opposite is the case, or if the hydrogen-containing gas supplied to the anode is not sufficiently humid for the temperature of the cell in the compressor, the electrolyte membrane can dry to an extent that it is difficult to keep the electrolyte membrane as moist as needed to secure its high proton conductivity.

As can be seen from this, setting the dew point of the hydrogen-containing gas supplied to the anode to be appropriate for the temperature of the cell in the compressor is important for reducing flooding at the anode and limiting the loss of proton conductivity of the electrolyte membrane. For example, it is desirable to supply the anode with a hydrogen-containing gas having a dew point almost equal to the temperature of the cell.

To this end, the hydrogen system according to this aspect controls the flow rate of the hydrogen-containing gas that has passed through the bypass path, which is heavily humidified, and that of the hydrogen-containing gas dehumidified through the heat exchanger and the cooling mechanism, which is lightly humidified, to achieve a desired ratio therebetween. As a result, the dew point of the hydrogen-containing gas supplied to the anode is set to be appropriate for the temperature of the cell in the compressor.

A hydrogen system according to a third aspect of the present disclosure is: In the second aspect, the hydrogen system may include a flow regulator that regulates the flow rate of the hydrogen-containing gas flowing through the bypass path and a controller that controls the flow regulator to increase the flow rate of the hydrogen-containing gas flowing through the bypass path when there is an increase in the temperature of the cell including the electrolyte membrane, the anode, and the cathode.

Configured as such, the hydrogen system according to this aspect ensures, through the control of the flow rate of the hydrogen-containing gas flowing through the bypass path with its flow regulator, that the dew point of the hydrogen-containing gas supplied to the anode is increased to an appropriate level as the temperature of the cell in the compressor rises.

A hydrogen system according to a fourth aspect of the present disclosure is: In any one of the first to third aspects, the cooling mechanism in the hydrogen system may include a cooler that cools the hydrogen-containing gas flowing through the supply path.

Even after the hydrogen-containing gas has been dehumidified through the heat exchanger and the cooling mechanism, the steam therein can condense at the anode as long as the humidity is too high for the temperature of the cell in the compressor. In that case, therefore, flooding caused by condensate can occur at the anode. For example, if the supply path is cooled by the ambient air at the cooling mechanism, the dehumidification of the hydrogen-containing gas by the cooling mechanism can be insufficient depending on the relative magnitudes of the external temperature and the temperature of the hydrogen-containing gas. To take another example, in wintertime, compared with summertime, the dehumidification of the hydrogen-containing gas by the heat exchanger and the cooling mechanism can be insufficient because the temperature of the cell in the compressor tends to be low at start-up.

To address this, the hydrogen system according to this aspect further includes a cooler as described above. The cooler helps further cool and dehumidify the hydrogen-containing gas that has been dehumidified through the heat exchanger and the cooling mechanism. The hydrogen system according to this aspect, therefore, is prevented effectively from flooding caused by condensate, for example even at start-up in wintertime.

A hydrogen system according to a fifth aspect of the present disclosure is: In the fourth aspect, the hydrogen system may include a controller that reduces the power of the cooler when there is an increase in the temperature of the cell including the electrolyte membrane, the anode, and the cathode.

Configured as such, the hydrogen system according to this aspect ensures, through the control of the power of the cooler, that the dew point of the hydrogen-containing gas supplied to the anode is increased to an appropriate level as the temperature of the cell in the compressor rises.

A hydrogen system according to a sixth aspect of the present disclosure is: In any one of the first to fifth aspects, the hydrogen system may include a heater, in the supply path, that further heats the hydrogen-containing gas that has been heated through the heat exchanger.

Configured as such, the hydrogen system according to this aspect allows the temperature of the hydrogen-containing gas to be increased to an appropriate level using the heater. The cell in the compressor, therefore, can be heated to its desired temperature effectively with the heat of the hydrogen-containing gas, and, as a result, hydrogen compression by the compressor becomes more efficient.

A hydrogen system according to a seventh aspect of the present disclosure is: In any one of the first to sixth aspects, the hydrogen-containing gas to be supplied to the anode, with steam therein, in the hydrogen system may include a hydrogen-containing gas produced using a water electrolyzer.

A hydrogen system according to an eighth aspect of the present disclosure is: In any one of the first to sixth aspects, the hydrogen-containing gas to be supplied to the anode, with steam therein, in the hydrogen system may include a reformed gas produced by steam reforming or autothermal reforming of a feedstock including an organic compound made up of carbon and hydrogen.

The following describes embodiments of the present disclosure with reference to the attached drawings. The embodiments described below are all given to illustrate examples of the aspects described above. That is, the shapes, materials, structural elements, the positions of and connections between elements, and other information given below are not intended to limit the aspects described above unless given in a claim. Any element mentioned below but not recited in the independent claim, which represents the most generic concept of the present disclosure, is described as being optional. An element assigned the same reference sign in different drawings may be described only once. The drawings are schematic illustrations of structural elements given to help understand and therefore may be inaccurate in the representation of shape, relative dimensions, etc.

Embodiment 1

Structure of the Hydrogen System

FIG. 1 is a diagram illustrating an example of a hydrogen system according to Embodiment 1.

In the example illustrated in FIG. 1, the hydrogen system 200 includes an electrochemical hydrogen compressor 100, a heat exchanger 110, an anode gas supply path 29, and a cooling mechanism 117.

The electrochemical hydrogen compressor 100 has an electrolyte membrane 11, an anode AN, a cathode CA, and a voltage applicator 102. The electrochemical hydrogen compressor 100 is a device being such that with at least one hydrogen-containing gas with steam therein supplied to the anode AN, the voltage applicator 102 applies a voltage between the anode AN and the cathode CA to transfer hydrogen present in the hydrogen-containing gas through the electrolyte membrane 11 to the cathode CA and pressurize the hydrogen at the same time. The electrochemical hydrogen compressor 100 can be in any form as long as it is an electrochemical, or electrolyte membrane 11-based, pressure booster. For example, the electrochemical hydrogen compressor 100 in FIG. 1 has the aforementioned anode gas supply path 29, an anode gas discharge path 31, through which the hydrogen-containing gas flows to be discharged from the anode AN, and a cathode gas discharge path 26, through which hydrogen ($H_2$) flows to be discharged from the cathode CA. The detailed structure of such an electrochemical hydrogen compressor 100 is described later herein.

The hydrogen-containing gas supplied to the anode AN, with steam therein, may include, for example, a hydrogen-containing gas produced using a water electrolyzer, or may include a reformed gas produced by steam reforming or autothermal reforming of a feedstock including an organic compound made up of carbon and hydrogen (hereinafter, a hydrocarbon feedstock).

The anode gas supply path 29 is a flow channel through which a hydrogen-containing gas with steam therein flows to be supplied to the anode AN in the electrochemical hydrogen compressor 100.

The heat exchanger 110 is a device that is in the anode gas supply path 29 and exchanges heat between the hydrogen-containing gas flowing through the anode gas supply path 29 upstream of the cooling mechanism 117 and the hydrogen-containing gas flowing through the anode gas supply path 29 downstream of the cooling mechanism 117. The portion of the anode gas supply path 29 upstream of the cooling mechanism 117 and passing through the heat exchanger 110 is referred to as the primary flow channel 110A of the heat exchanger 110, and the portion of the anode gas supply path 29 downstream of the cooling mechanism 117 and passing through the heat exchanger 110 is referred to as the secondary flow channel 110б of the heat exchanger 110.

The cooling mechanism 117 is in the anode gas supply path 29. Specifically, the cooling mechanism 117 is in the anode gas supply path 29 between the gas outlet of the primary flow channel 110A of the heat exchanger 110 and the gas inlet of the secondary flow channel 110б of the heat exchanger 110.

The cooling mechanism 117 can be in any form as long as the hydrogen-containing gas can be cooled therewith while flowing through the anode gas supply path 29 between the primary flow channel 110A of the heat exchanger 110 and the secondary flow channel 110б of the heat exchanger 110.

For example, the cooling mechanism 117 may be air cooling of the piping forming the anode gas supply path 29 provided by not covering the piping with a thermal insulator. To take another example, the cooling mechanism 117 may include a cooler that cools the hydrogen-containing gas. Examples of coolers include a heat sink, for example having heat-radiating fins, and a cooling device that uses a coolant. The coolant can be, for example, cold air or a liquid coolant.

In the example illustrated in FIG. 1, the anode gas supply path 29 is cooled by the ambient air at the cooling mechanism 117. As for the case in which the cooling mechanism 117 includes a cooler, an exemplary configuration is described in Embodiment 3.

The heat exchanger 110 doubles as a condenser. At the heat exchanger 110, latent heat recovery takes place: The steam in the hydrogen-containing gas flowing through the primary flow channel 110A, which is humid, produces latent heat when condensed, and this latent heat is collected by heat exchange into the hydrogen-containing gas flowing through the secondary flow channel 110б, which is dry. That is, the former hydrogen-containing gas corresponds to the heating fluid of a heat exchanger, and the latter hydrogen-containing gas corresponds to the heated fluid of a heat exchanger.

To take a specific example, if a hot and humid (e.g., a temperature and a dew point of approximately 80° C.) hydrogen-containing gas produced by water electrolysis or by reforming of a hydrocarbon feedstock is supplied to the anode AN in the electrochemical hydrogen compressor 100, the hydrogen-containing gas flowing through the primary flow channel 110A of the heat exchanger 110, which is at a high temperature and heavily humidified, is cooled, or its temperature falls, through the heat exchanger 110, and the steam therein condenses at the same time. That is, in the primary flow channel 110A of the heat exchanger 110, the temperature and dew point of the hydrogen-containing gas become lower than those of the hydrogen-containing gas produced by water electrolysis or by reforming of a hydrocarbon feedstock.

As illustrated in FIG. 1, the anode gas supply path 29 is routed so that the hydrogen-containing gas that has passed through the primary flow channel 110A of the heat exchanger 110 will flow back into the secondary flow channel 110B of the heat exchanger 110. By virtue of this, at the heat exchanger 110, the hydrogen-containing gas flowing through the secondary flow channel 110B receives transmitted latent heat resulting from the condensation of the steam in the hydrogen-containing gas flowing through the primary flow channel 110A. The hydrogen-containing gas that has passed through the primary flow channel 110A of the heat exchanger 110 is cooled by the ambient air before flowing into the secondary flow channel 110B of the heat exchanger 110 because of the cooling mechanism 117. The temperature of the gas falls, and more steam therein condenses.

By virtue of these, in the secondary flow channel 110B of the heat exchanger 110, the temperature of the hydrogen-containing gas increases because latent heat of condensation heats the gas, but the dew point of the gas is maintained low.

Structure of the Electrochemical Hydrogen Compressor

Figure 2A:
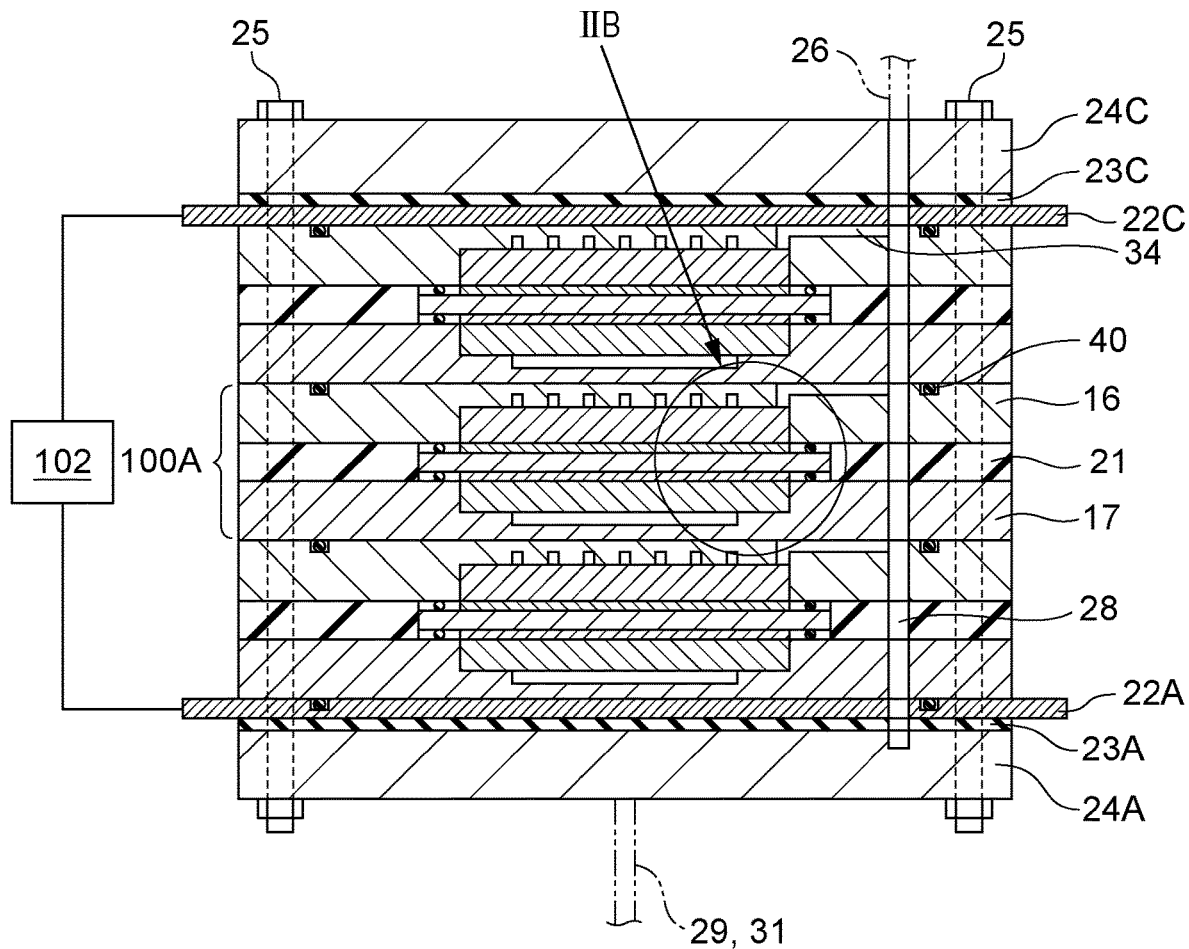
FIG. 2A is a diagram illustrating an example of an electrochemical hydrogen compressor in a hydrogen system according to Embodiment 1.
Figure 2B:
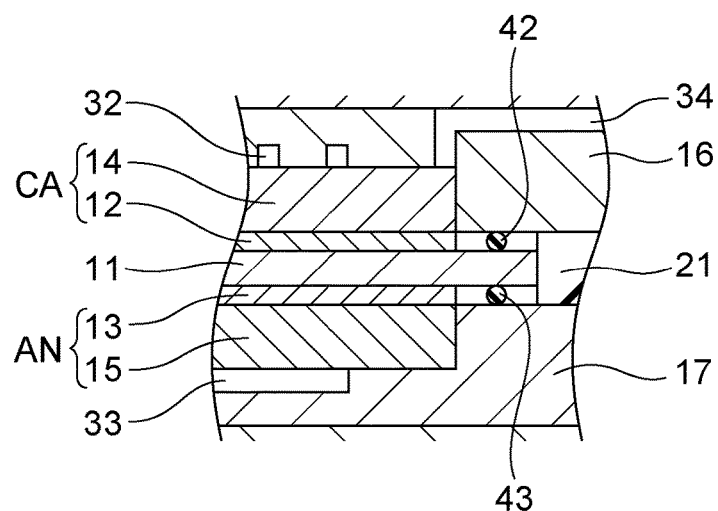
FIG. 2B is an enlarged view of portion IIB of the electrochemical hydrogen compressor illustrated in FIG. 2A.
Figure 3A:
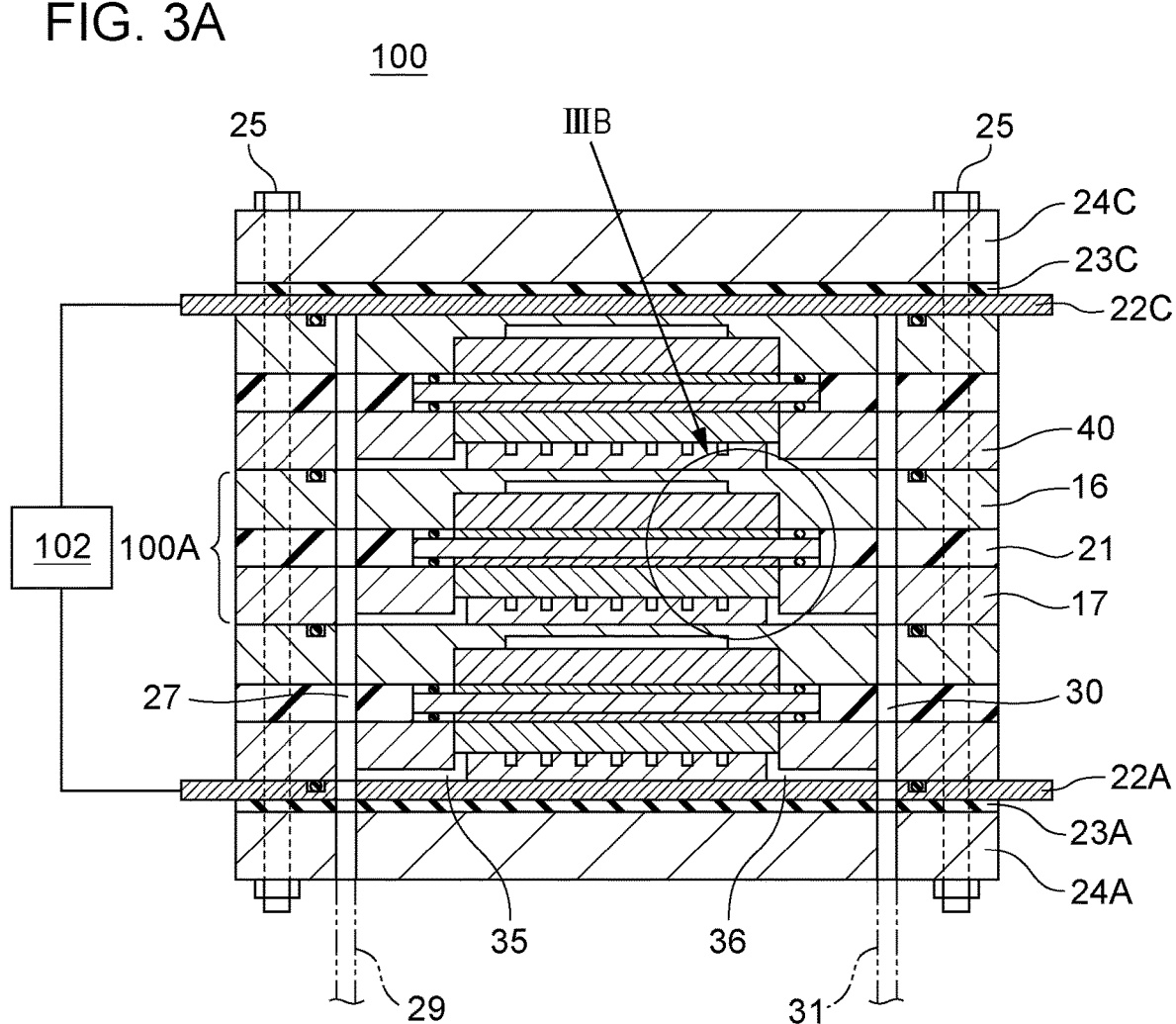
FIG. 3A is a diagram illustrating an example of an electrochemical hydrogen compressor in a hydrogen system according to Embodiment 1.
Figure 3B:
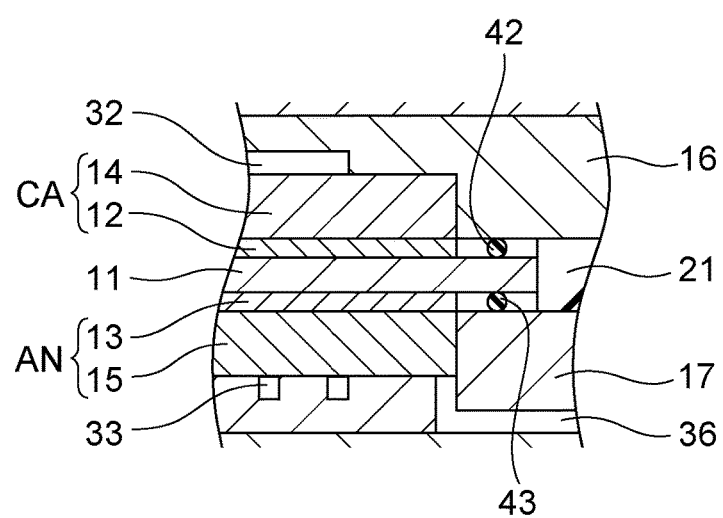
FIG. 3B is an enlarged view of portion IIIB of the electrochemical hydrogen compressor illustrated in FIG. 3A.

FIGS. 2A and 3A are diagrams illustrating an example of an electrochemical hydrogen compressor in a hydrogen system according to Embodiment 1. FIG. 2B is an enlarged view of portion IIB of the electrochemical hydrogen compressor illustrated in FIG. 2A. FIG. 3B is an enlarged view of portion IIIB of the electrochemical hydrogen compressor illustrated in FIG. 3A.

FIG. 2A illustrates a vertical section of an electrochemical hydrogen compressor 100 that includes a straight path passing through the center of the electrochemical hydrogen compressor 100 and the center of a cathode gas outlet manifold 28 in plan view. FIG. 3A illustrates a vertical section of the electrochemical hydrogen compressor 100 that includes a straight path passing through the center of the electrochemical hydrogen compressor 100, the center of an anode gas inlet manifold 27, and the center of an anode gas outlet manifold 30 in plan view.

In the example illustrated in FIGS. 2A and 3A, the electrochemical hydrogen compressor 100 includes at least one hydrogen pump unit 100A.

The electrochemical hydrogen compressor 100 has a stack of multiple hydrogen pump units 100A. For example, in FIGS. 2A and 3A, there is a three-tier stack of hydrogen pump units 100A. This, however, is not the only possible number of hydrogen pump units 100A. That is, any number of hydrogen pump units 100A can be used as appropriate on the basis of the operating conditions, such as the volume of hydrogen the electrochemical hydrogen compressor 100 pressurizes.

A hydrogen pump unit 100A includes an electrolyte membrane 11, an anode AN, a cathode CA, a cathode separator 16, an anode separator 17, and an insulator 21. In a hydrogen pump unit 100A, furthermore, an electrolyte membrane 11, an anode catalyst layer 13, a cathode catalyst layer 12, an anode gas diffusion layer 15, a cathode gas diffusion layer 14, an anode separator 17, and a cathode separator 16 are stacked together.

The anode AN is on a first primary surface of the electrolyte membrane 11. The anode AN is an electrode that includes an anode catalyst layer 13 and an anode gas diffusion layer 15. There is a ring-shaped seal 43 surrounding the anode catalyst layer 13 in plan view, and the anode catalyst layer 13 is sealed with the seal 43 properly.

The cathode CA is on a second primary surface of the electrolyte membrane 11. The cathode CA is an electrode that includes a cathode catalyst layer 12 and a cathode gas diffusion layer 14. There is a ring-shaped seal 42 surrounding the cathode catalyst layer 12 in plan view, and the cathode catalyst layer 12 is sealed with the seal 42 properly.

By virtue of these, the electrolyte membrane 11 is sandwiched between the anode AN and cathode CA to touch each of the anode and cathode catalyst layers 13 and 12. The stack of the cathode CA, electrolyte membrane 11, and anode AN is referred to as a membrane electrode assembly (hereinafter MEA), and an MEA in the electrochemical hydrogen compressor 100 is referred to as a cell.

The electrolyte membrane 11 is proton-conductive. The electrolyte membrane 11 can be of any type as long as it is proton-conductive. For example, the electrolyte membrane 11 can be a fluoropolymer or hydrocarbon polymer electrolyte membrane, although these are not the only possibilities. Specific examples of membranes that can be used as the electrolyte membrane 11 include Nafion® (DuPont) and Aciplex® (Asahi Kasei Corporation) membranes.

The anode catalyst layer 13 is on the first primary surface of the electrolyte membrane 11. An example of a catalyst metal contained in the anode catalyst layer 13 is platinum, but this is not the only possibility.

The cathode catalyst layer 12 is on the second primary surface of the electrolyte membrane 11. An example of a catalyst metal contained in the cathode catalyst layer 12 is platinum, but this is not the only possibility.

Examples of catalyst carriers for the cathode and anode catalyst layers 12 and 13 include, but are not limited to, a carbon powder, for example of carbon black or graphite, and an electrically conductive oxide powder.

In the cathode and anode catalyst layers 12 and 13, fine particles of catalyst metal are held on a catalyst carrier in a highly dispersed state. Usually, a hydrogen ion-conductive ionomer component is added to these cathode and anode catalyst layers 12 and 13 to expand the field for electrode reactions.

The cathode gas diffusion layer 14 is on the cathode catalyst layer 12. The cathode gas diffusion layer 14 is a porous medium, conducts electricity, and allows gases to diffuse therethrough. Desirably, the cathode gas diffusion layer 14 is elastic so that it will properly follow the displacement and deformation of structural elements of the electrochemical hydrogen compressor 100 that occur in response to a differential pressure between the cathode CA and anode AN while the hydrogen pump 100 is in operation. For the electrochemical hydrogen compressor 100 according to this embodiment, the cathode gas diffusion layer 14 is an element made from carbon fibers. For example, the cathode gas diffusion layer 14 may be a porous carbon fiber sheet, such as a piece of carbon paper, carbon cloth, or carbon felt. The base material for the cathode gas diffusion layer 14, however, does not need to be a carbon fiber sheet. For example, the base material for the cathode gas diffusion layer 14 may be a sintered mass of metal fibers, for example made from titanium, a titanium alloy, or stainless steel, a sintered mass of a metal powder made from any such metal, etc.

The anode gas diffusion layer 15 is on the anode catalyst layer 13. The anode gas diffusion layer 15 is a porous medium, conducts electricity, and allows gases to diffuse therethrough. Desirably, the anode gas diffusion layer 15 is highly rigid so that it will limit the displacement and deformation of structural elements of the electrochemical hydrogen compressor 100 that occur in response to a differential pressure between the cathode CA and anode AN while the hydrogen pump 100 is in operation.

For the electrochemical hydrogen compressor 100 according to this embodiment, the anode gas diffusion layer 15 is an element prepared by shaping a sintered mass of a titanium powder into a thin plate. This, however, is not the only possibility. That is, the base material for the anode gas diffusion layer 15 can be, for example, a sintered mass of metal fibers, for example made from titanium, a titanium alloy, or stainless steel, or a sintered mass of a metal powder made from any such metal. A piece of expanded metal, metal mesh, or perforated metal, for example, can also be used as the base material for the anode gas diffusion layer 15.

The anode separator 17 is an element disposed on the anode gas diffusion layer 15 of the anode AN. The cathode separator 16 is an element disposed on the cathode gas diffusion layer 14 of the cathode CA.

In the middle of each of the cathode and anode separators 16 and 17 is a recess. In these recesses, the cathode and anode gas diffusion layers 14 and 15 are contained respectively.

In such a way, an MEA as described above is sandwiched between cathode and anode separators 16 and 17, forming a hydrogen pump unit 100A.

The primary surface of the cathode separator 16 touching the cathode gas diffusion layer 14 has a cathode gas flow channel 32 created therein, for example a serpentine one that includes multiple U-shaped turns and multiple straight stretches in plan view. The straight stretches of the cathode gas flow channel 32 extend perpendicular to the plane of the page of FIG. 2A. Such a cathode gas flow channel 32, however, is by way of example and is not the only possibility. For example, the cathode gas flow channel may be formed by multiple linear passages.

The primary surface of the anode separator 17 touching the anode gas diffusion layer 15 has an anode gas flow channel 33 created therein, for example a serpentine one that includes multiple U-shaped turns and multiple straight stretches in plan view. The straight stretches of the anode gas flow channel 33 extend perpendicular to the plane of the page of FIG. 3A. Such an anode gas flow channel 33, however, is by way of example and is not the only possibility. For example, the anode gas flow channel may be formed by multiple linear passages.

Between the electrically conductive cathode and anode separators 16 and 17, furthermore, there is a ring-shaped flat-plate insulator 21 surrounding the edge of the MEA. By virtue of this, short-circuiting between the cathode and anode separators 16 and 17 is prevented.

The electrochemical hydrogen compressor 100 also includes first and second end plates, which are at the ends in the direction of stacking of the hydrogen pump units 100A, and fasteners 25, which fasten the hydrogen pump units 100A, first end plate, and second end plate together in the direction of stacking.

In the example illustrated in FIGS. 2A and 3A, a cathode end plate 24C and an anode end plate 24A correspond to these first and second end plates, respectively. That is, the anode end plate 24A is an end plate disposed on the anode separator 17 located at a first end in the direction of stacking of the components of the hydrogen pump units 100A. The cathode end plate 24C is an end plate disposed on the cathode separator 16 located at a second end in the direction of stacking of the components of the hydrogen pump units 100A.

The fasteners 25 can be of any type as long as the hydrogen pump units 100A, cathode end plate 24C, and anode end plate 24A can be fastened together in the direction of stacking therewith.

For example, the fasteners 25 can be bolts and nuts with a disk spring or a similar tool.

The bolts as a component of the fasteners 25 in that case may be made to penetrate only through the anode and cathode end plates 24A and 24C. For the electrochemical hydrogen compressor 100 according to this embodiment, however, the bolts penetrate through the components of the three-tier stack of hydrogen pump units 100A, a cathode feed plate 22C, a cathode insulating plate 23C, an anode feed plate 22A, an anode insulating plate 23A, the anode end plate 24A, and the cathode end plate 24C. The fasteners 25 apply a desired pressure to the hydrogen pump units 100A by compressing an end face of the cathode separator 16 at the second end in the aforementioned direction of stacking and an end face of the anode separator 17 at the first end in the aforementioned direction of stacking with the cathode and anode end plates 24C and 24A, respectively, with the cathode feed plate 22C and insulating plate and 23C and the anode feed plate 22A and insulating plate 23A interposed therebetween.

By virtue of these, the electrochemical hydrogen compressor 100 according to this embodiment keeps its three-tier stack of hydrogen pump units 100A properly stacked in the aforementioned direction of stacking by making use of fastening pressure applied by fasteners 25.

For the electrochemical hydrogen compressor 100 according to this embodiment, furthermore, the cathode gas flow channel 32, through which hydrogen ($H_2$) coming out of the cathode gas diffusion layer 14 flows, of each individual hydrogen pump unit 100A communicates with one another. The following describes how the cathode gas flow channels 32 communicate with reference to drawings.

First, as illustrated in FIG. 2A, the cathode gas outlet manifold 28 is a series of through holes created through the components of the three-tier stack of hydrogen pump units 100A and the cathode end plate 24C and a blind hole created in the anode end plate 24A. The cathode end plate 24C also has a cathode gas discharge path 26. The cathode gas discharge path 26 may be piping through which hydrogen discharged from the cathodes CA flows. The cathode gas discharge path 26 communicates with this cathode gas outlet manifold 28.

The cathode gas outlet manifold 28, furthermore, communicates with one end of the cathode gas flow channel 32 of each individual hydrogen pump unit 100A via separate cathode gas conduits 34. By virtue of this, streams of hydrogen that have passed through the cathode gas flow channel 32 and cathode gas conduit 34 of each individual hydrogen pump unit 100A are combined together at the cathode gas outlet manifold 28. The combined stream of hydrogen is then guided to the cathode gas discharge path 26.

In such a way, the cathode gas flow channel 32 of each individual hydrogen pump unit 100A communicates with one another via the cathode gas conduit 34 of each hydrogen pump unit 100A and the cathode gas outlet manifold 28.

Between cathode and anode separators 16 and 17, a cathode separator 16 and the cathode feed plate 22C, and an anode separator 17 and the anode feed plate 22A, there are ring-shaped seals 40, such as O-rings, surrounding the cathode gas outlet manifold 28 in plan view. The cathode gas outlet manifold 28 is sealed with these seals 40 properly.

As illustrated in FIG. 3A, the anode end plate 24A has an anode gas supply path 29. The anode gas supply path 29 may be piping through which the hydrogen-containing gas flows to be supplied to the anodes AN. The anode gas supply path 29 communicates with a tubular anode gas inlet manifold 27. The anode gas inlet manifold 27 is a series of through holes created through the components of the three-tier stack of hydrogen pump units 100A and the anode end plate 24A.

The anode gas inlet manifold 27 communicates with a first end of the anode gas flow channel 33 of each individual hydrogen pump unit 100A via separate first anode gas conduits 35. By virtue of this, the hydrogen-containing gas supplied from the anode gas supply path 29 to the anode gas inlet manifold 27 is distributed to each individual hydrogen pump unit 100A through the first anode gas conduit 35 of each hydrogen pump unit 100A. While passing through the anode gas flow channel 33, the distributed hydrogen-containing gas is supplied to the anode catalyst layer 13 through the anode gas diffusion layer 15.

As illustrated in FIG. 3A, the anode end plate 24A also has an anode gas discharge path 31. The anode gas discharge path 31 may be piping through which the hydrogen-containing gas discharged from the anodes AN flows. The anode gas discharge path 31 communicates with a tubular anode gas outlet manifold 30. The anode gas outlet manifold 30 is a series of through holes created through the components of the three-tier stack of hydrogen pump units 100A and the anode end plate 24A.

The anode gas outlet manifold 30 communicates with a second end of the anode gas flow channel 33 of each individual hydrogen pump unit 100A via separate second anode gas conduits 36. By virtue of this, streams of the hydrogen-containing gas that have passed through the anode gas flow channel 33 of each individual hydrogen pump unit 100A are supplied to the anode gas outlet manifold 30, and combined together there, through each individual second anode gas conduit 36. The combined stream of the hydrogen-containing gas is then guided to the anode gas discharge path 31.

Between cathode and anode separators 16 and 17, a cathode separator 16 and the cathode feed plate 22C, and an anode separator 17 and the anode feed plate 22A, there are ring-shaped seals 40, such as O-rings, surrounding the anode gas inlet and outlet manifolds 27 and 30 in plan view. The anode gas inlet and outlet manifolds 27 and 30 are sealed with these seals 40 properly.

As illustrated in FIGS. 2A and 3A, the electrochemical hydrogen compressor 100 includes a voltage applicator 102.

The voltage applicator 102 is a device that applies a voltage between the anode and cathode catalyst layers 13 and 12. Specifically, the high potential of the voltage applicator 102 has been applied to the anode catalyst layer 13, and the low potential of the voltage applicator 102 has been applied to the cathode catalyst layer 12. The voltage applicator 102 can be of any type as long as a voltage can be applied between the anode and cathode catalyst layers 13 and 12 therewith. For example, the voltage applicator 102 may be a device that controls the voltage applied between the anode and cathode catalyst layers 13 and 12. The voltage applicator 102 in that case is equipped with a DC-to-DC converter if it is connected to a direct-current power supply, such as a battery, solar cell, or fuel cell, or with an AC-to-DC converter if it is connected to an alternating-current power supply, such as mains electricity.

Alternatively, the voltage applicator 102 may be, for example, a multi-range power supply, with which the voltage applied between the anode and cathode catalyst layers 13 and 12 and the current that flows between the anode and cathode catalyst layers 13 and 12 are controlled so that the amount of electricity supplied to the hydrogen pump units 100A will match a particular preset value.

In the example illustrated in FIGS. 2A and 3A, the low-potential terminal of the voltage applicator 102 is connected to the cathode feed plate 22C, and the high-potential terminal of the voltage applicator 102 is connected to the anode feed plate 22A. The cathode feed plate 22C is in electrical contact with the cathode separator 16 located at the second end in the aforementioned direction of stacking, and the anode feed plate 22A is in electrical contact with the anode separator 17 located at the first end in the aforementioned direction of stacking.

Although not illustrated in FIGS. 1, 2A, and 3A, the hydrogen system 200 according to this embodiment includes any other component or equipment if the electrochemical hydrogen compressor 100 requires it to compress hydrogen.

For example, the hydrogen system 200 is fitted with a temperature sensor that detects the temperature of the electrochemical hydrogen compressor 100, a pressure sensor that detects the pressure of hydrogen increased at the cathodes CA in the electrochemical hydrogen compressor 100.

The hydrogen system 200 also has valves or similar devices at appropriate points in the anode gas supply path 29, anode gas discharge path 31, and cathode gas discharge path 26 to open and close these routes.

It should be noted that these structures of the electrochemical hydrogen compressor 100 and the hydrogen system 200 are by way of example and are not the only possibilities. For example, the electrochemical hydrogen compressor 100 may have a dead-end structure, in which the compressor 100 has no anode gas outlet manifold 30 and no anode gas discharge path 31 and pressurizes at its cathodes CA all hydrogen ($H_2$) in the hydrogen-containing gas supplied to its anodes AN through the anode gas inlet manifold 27.

Operation

In the following, an exemplary operation of a hydrogen system according to Embodiment 1 with reference to drawings.

The following operation may be carried out as a result of, for example, the processor of a controller, not illustrated, reading a control program stored in a data storage in the controller. The involvement of a controller in this operation, however, is optional. The person who operates the system may undertake part of the operation.

First, a low-pressure hydrogen-containing gas is supplied to an anode AN in an electrochemical hydrogen compressor 100. At the same time, a voltage from a voltage applicator 102 is applied to the electrochemical hydrogen compressor 100, triggering the hydrogen compression by the electrochemical hydrogen compressor 100 in the hydrogen system 200. A hydrogen-containing gas passes through a heat exchanger 110 and a cooling mechanism 117 provided in an anode gas supply path 29 before being supplied to the anode AN in the electrochemical hydrogen compressor 100.

At an anode catalyst layer 13 of the anode AN, hydrogen molecules in the hydrogen-containing gas dissociate into hydrogen ions (protons) and electrons through oxidation (formula (1)). The protons move to a cathode catalyst layer 12 by traveling through the inside of an electrolyte membrane 11. The electrons move to the cathode catalyst layer 12 through the voltage applicator 102.

Then, at the cathode catalyst layer 12, hydrogen molecules are regenerated through reduction (formula (2)). As known, while protons travel through the inside of the electrolyte membrane 11, a particular amount of water moves together with the protons from the anode AN to the cathode CA as electroosmotic water.

During this, the hydrogen produced at the cathode CA can be compressed by increasing the pressure drop in a hydrogen outlet path using a flow controller, not illustrated. An example of a hydrogen outlet path is the cathode gas discharge path 26 illustrated in FIGS. 1 and 2A. An example of a flow controller is a back pressure valve, flow regulator valve, or similar device provided in the hydrogen outlet path.

$$\text{Anode: } H_2 \text{ (low pressure)} \rightarrow 2H^+ + 2e^- + \tag{1}$$

$$\text{Cathode: } 2H^+ + 2e^- \rightarrow H_2 \text{ (high pressure)} \tag{2}$$

In such a way, the operation at the electrochemical hydrogen compressor 100 is carried out. A hydrogen-containing gas with steam therein is supplied to an anode AN, and hydrogen present in the hydrogen-containing gas is transferred through an electrolyte membrane 11 to a cathode CA while being pressurized at the same time.

Furthermore, in a primary flow channel 110A of the heat exchanger 110 and at the cooling mechanism 117, the hydrogen-containing gas to be supplied to the anode AN in the electrochemical hydrogen compressor 100 is cooled so that the steam therein will condense. In a secondary flow channel 110B of the heat exchanger 110, the hydrogen-containing gas to be supplied the anode AN in the electrochemical hydrogen compressor 100 is heated by latent heat resulting from the condensation.

By virtue of these, the hydrogen system 200 according to this embodiment can make hydrogen compression by an electrochemical hydrogen compressor 100 more efficient than it is now.

Specifically, if the hydrogen-containing gas supplied to the anode AN is too humid for the temperature of the cell in the electrochemical hydrogen compressor 100, the steam in the hydrogen-containing gas condenses at the anode AN, and the resulting condensate can cause flooding in gas flow channels in the electrochemical hydrogen compressor 100. The hydrogen system 200 according to this embodiment, however, has a heat exchanger 110 and a cooling mechanism 117 in the anode gas supply path 29, through which the hydrogen-containing gas flows to be supplied to the anode AN. The hydrogen-containing gas supplied to the anode AN is dehumidified at the heat exchanger 110 and the cooling mechanism 117, and this helps control the humidity of the hydrogen-containing gas to a level appropriate for the temperature of the cell in the electrochemical hydrogen compressor 100. This reduces the risk of flooding at the anode AN, and, as a result, the hydrogen system 200 according to this embodiment achieves improved efficiency of hydrogen compression by the electrochemical hydrogen compressor 100.

In addition, the steam in the hydrogen-containing gas flowing through the primary flow channel 110A of the heat exchanger 110 produces latent heat when condensing, but the hydrogen system 200 according to this embodiment collects this latent heat into the hydrogen-containing gas flowing the secondary flow channel 1106 of the heat exchanger 110, allowing the latent heat to be used effectively to heat the cell in the electrochemical hydrogen compressor 100. This ensures the cell is heated to its desired temperature effectively, and, as a result, the hydrogen system 200 according to this embodiment achieves improved efficiency of hydrogen compression by the electrochemical hydrogen compressor 100. The hydrogen system 200 according to this embodiment, therefore, requires no electric heater or similar heat source, for example, to heat the cell in the electrochemical hydrogen compressor 100. Even if it is assumed that such a heat source is used, furthermore, the required power of the heat source is lower.

EXAMPLE

Figure 4:
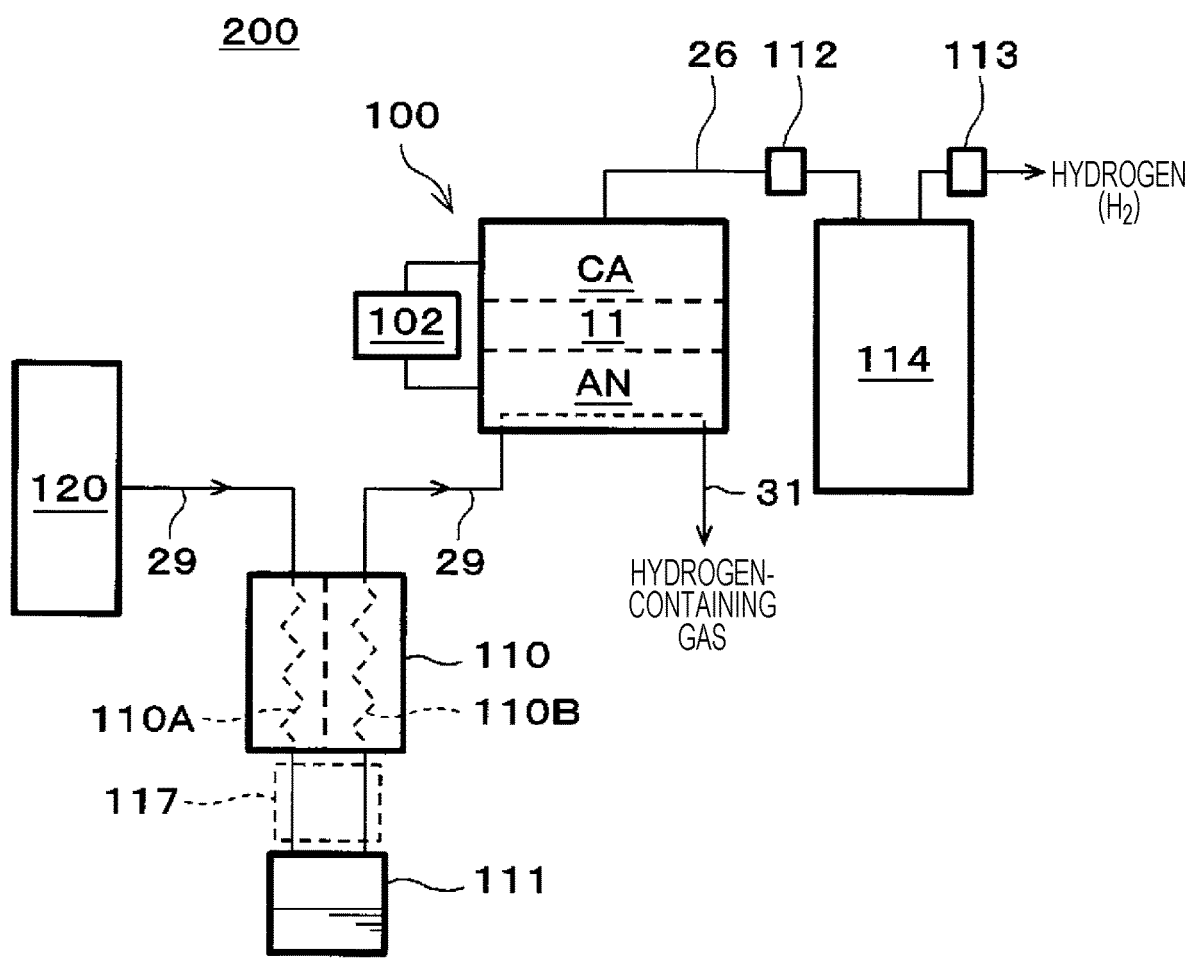
FIG. 4 is a diagram illustrating an example of a hydrogen system according to an example of Embodiment 1.

FIG. 4 is a diagram illustrating an example of a hydrogen system according to an example of Embodiment 1.

In the example illustrated in FIG. 4, the hydrogen system 200 includes an electrochemical hydrogen compressor 100, a heat exchanger 110, an anode gas supply path 29, a cooling mechanism 117, a condensate tank 111, a hydrogen reservoir 114, a hydrogen source 120, a first valve 112, and a second valve 113.

The electrochemical hydrogen compressor 100, cooling mechanism 117, and heat exchanger 110 are the same as in Embodiment 1. In the example illustrated in FIG. 4, therefore, the anode gas supply path 29 is cooled by the ambient air at the cooling mechanism 117.

The hydrogen source 120 is a device that supplies a hydrogen-containing gas to the anode AN in the electrochemical hydrogen compressor 100 through the heat exchanger 110. A hydrogen-containing gas for such a hydrogen source 120 may be produced by, for example, water electrolysis or reforming of a hydrocarbon feedstock.

The condensate tank 111 is a device that stores condensate that results from the condensation of steam in the hydrogen-containing gas taking place in the primary flow channel 110A of the heat exchanger 110 and at the cooling mechanism 117. Specifically, the condensate tank 111 is in the anode gas supply path 29 between the gas outlet of the primary flow channel 110A of the heat exchanger 110 and the gas inlet of the secondary flow channel 110B of the heat exchanger 110 and is such that the hydrogen-containing gas flows through the headspace of the condensate tank 111. There may be in the bottom wall of the condensate tank 111 a drain path and a drain valve (not illustrated) for draining condensate out of the condensate tank 111.

The hydrogen reservoir 114 is a device that stores hydrogen ($H_2$) pressurized at the cathode CA. An example of a hydrogen reservoir 114 is a hydrogen tank.

The first valve 112 is in the cathode gas discharge path 26 between the gas outlet of the cathode CA in the electrochemical hydrogen compressor 100 and the gas inlet of the hydrogen reservoir 114. The second valve 113 is in the hydrogen supply route extending from the gas outlet of the hydrogen reservoir 114. That is, high-pressure hydrogen can be stored in the hydrogen reservoir 114 by opening the first valve 112 and closing the second valve 113 while the electrochemical hydrogen compressor 100 is operating to compress hydrogen. By closing the first valve 112 and opening the second valve 113 in a timely fashion, furthermore, the hydrogen stored in the hydrogen reservoir 114 is supplied to the entity that requires hydrogen. An example of an entity that requires hydrogen is a fuel cell that uses hydrogen to generate electricity. An example of the first and second valves 112 and 113 is flow regulator valves.

This hydrogen system 200, however, is by way of example and is not the only possibility. For example, the foregoing is about the case in which hydrogen is supplied from an electrochemical hydrogen compressor 100 to a hydrogen reservoir 114, but a hydrogen system 200 according to an aspect of the present disclosure as described above can be applied even if the hydrogen system 200 supplies hydrogen directly to an entity that requires hydrogen as a result of the hydrogen reservoir being bypassed or the hydrogen system 200 having no hydrogen reservoir (e.g., a hydrogen supply to a high-pressure hydrogen tank of a fuel cell vehicle).

The advantages offered by the hydrogen system 200 according to this example are not described. The advantages are the same as offered by the hydrogen system 200 according to Embodiment 1.

Except for the described features, the hydrogen system 200 according to this example may be the same as the hydrogen system 200 according to Embodiment 1.

Embodiment 2

Figure 5:
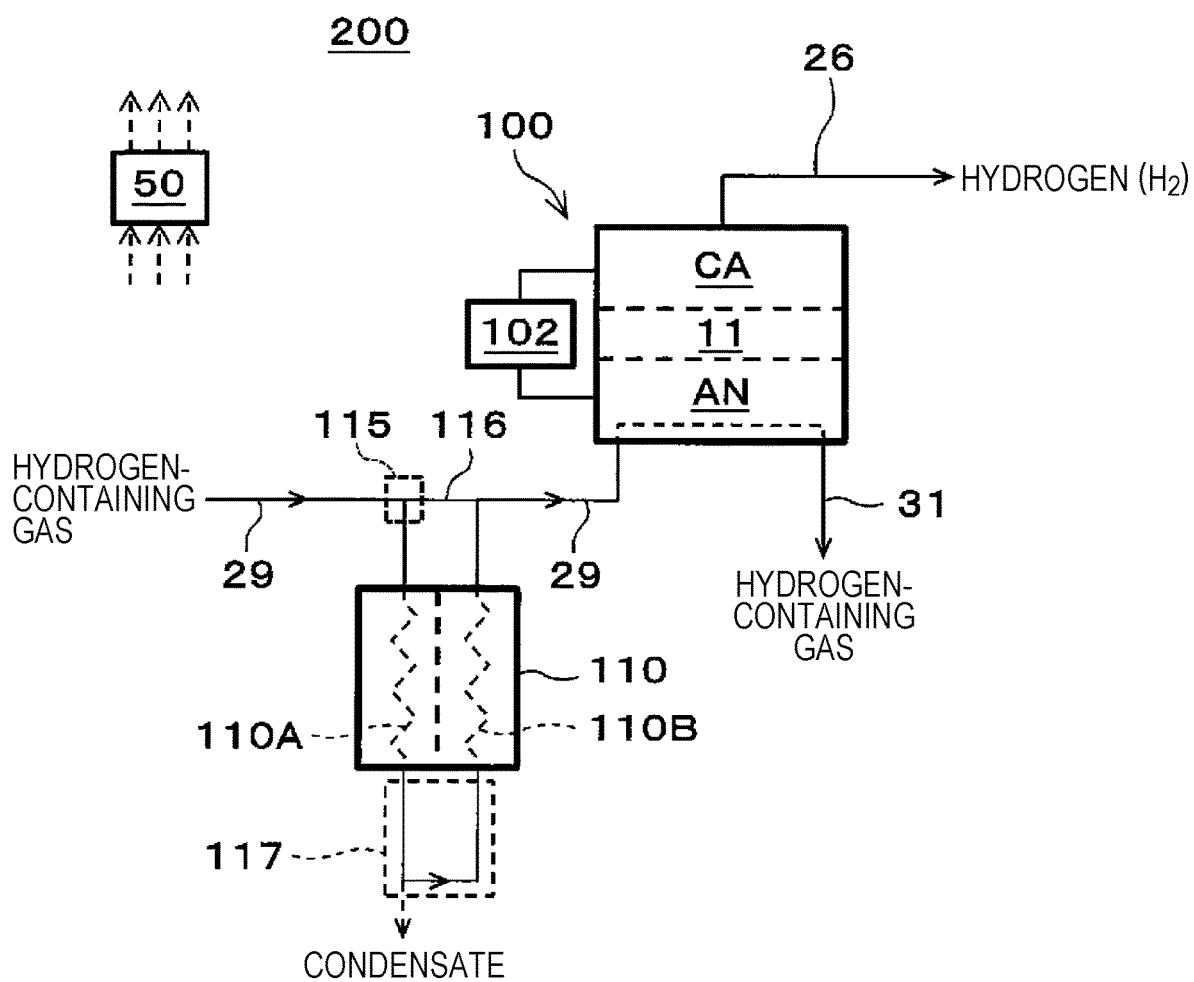
FIG. 5 is a diagram illustrating an example of a hydrogen system according to Embodiment 2.

FIG. 5 is a diagram illustrating an example of a hydrogen system according to Embodiment 2.

In the example illustrated in FIG. 5, the hydrogen system 200 includes an electrochemical hydrogen compressor 100, a heat exchanger 110, an anode gas supply path 29, a cooling mechanism 117, a bypass path 116, a flow regulator 115, and a controller 50.

The electrochemical hydrogen compressor 100, cooling mechanism 117, and heat exchanger 110 are the same as in Embodiment 1. In the example illustrated in FIG. 5, therefore, the anode gas supply path 29 is cooled by the ambient air at the cooling mechanism 117.

The bypass path 116 is a flow channel that branches from the anode gas supply path 29, bypasses the heat exchanger 110, and then joins the anode gas supply path 29. Specifically, as illustrated in FIG. 5, the upstream end of the bypass path 116 connects at the anode gas supply path 29 upstream of the gas inlet of the primary flow channel 110A of the heat exchanger 110, and the downstream end of the bypass path 116 connects at the anode gas supply path 29 downstream of the gas outlet of the secondary flow channel 110B of the heat exchanger 110.

The flow regulator 115 is a device that regulates the flow rate of the hydrogen-containing gas through the bypass path 116. The flow regulator 115 can be in any form as long as the flow rate of the hydrogen-containing gas through the bypass path 116 can be regulated therewith. An example of a flow regulator 115 is at least one flow regulator valve. Such flow regulator valve(s) may be a three-way valve installed at the joint (fork) between the anode gas supply path 29 and the upstream end of the bypass path 116 and controllable in terms of separation ratio. Alternatively, the flow regulator valve may be two-way valve(s) installed in the anode gas supply path 29 between this joint and the gas inlet of the primary flow channel 110A of the heat exchanger 110 and/or in the bypass path 116 and controllable in terms of degree of opening.

The controller 50 controls the flow regulator 115 to make the flow rate of the hydrogen-containing gas flowing through the bypass path 116, which is humid, the desired flow rate.

The controller 50 may control the overall operation of the hydrogen system 200. The controller 50 can be in any form as long as it has a control function. For example, the controller 50 includes a processor and a data storage that stores a control program. Examples of processors include an MPU and a CPU. An example of a data storage is a memory. The controller 50 may be a single controller that provides centralized control, or may be a set of multiple controllers that work together to provide distributed control.

As stated, the hydrogen source for the electrochemical hydrogen compressor 100 is a hot and humid hydrogen-containing gas produced by water electrolysis or a hot and humid hydrogen-containing gas produced by reforming of a hydrocarbon feedstock for example, and such a gas is used as anode gas for the electrochemical hydrogen compressor. This means a hot and humid hydrogen-containing gas with a dew point of approximately 80° C. is supplied to the anode AN of the cell in the electrochemical hydrogen compressor 100.

If the hydrogen-containing gas supplied to the anode AN is too humid for the temperature of the cell in the electrochemical hydrogen compressor 100 in that case, the steam condenses at the anode AN, and the resulting condensate can cause flooding at the anode AN. If the opposite is the case, or if the hydrogen-containing gas supplied to the anode AN is not sufficiently humid for the temperature of the cell in the electrochemical hydrogen compressor 100, the electrolyte membrane 11 can dry to an extent that it is difficult to keep the electrolyte membrane 11 as moist as needed to secure its high proton conductivity.

As can be seen from this, setting the dew point of the hydrogen-containing gas supplied to the anode AN to a level appropriate for the temperature of the cell in the electrochemical hydrogen compressor 100 is important for reducing flooding at the anode AN and limiting the loss of proton conductivity of the electrolyte membrane 11. For example, it is desirable to supply the anode AN with a hydrogen-containing gas having a dew point almost equal to the temperature of the cell.

To this end, the hydrogen system 200 according to this embodiment controls the flow rate of the hydrogen-containing gas that has passed through the bypass path 116, which is heavily humidified, and that of the hydrogen-containing gas dehumidified through the heat exchanger 110 and the cooling mechanism 117, which is lightly humidified, to achieve a desired ratio therebetween. As a result, the dew point of the hydrogen-containing gas supplied to the anode AN is set to a level appropriate for the temperature of the cell in the electrochemical hydrogen compressor 100.

Specifically, as illustrated in FIG. 5, the hydrogen-containing gas flowing through the bypass path 116 skips the heat exchanger 110, and therefore remains humid, when supplied to the anode AN of the electrochemical hydrogen compressor 100. That is, the faster the flow rate of the hydrogen-containing gas flowing through the bypass path 116, which is humid (in other words, the slower the flow rate of the hydrogen-containing gas that goes to the heat exchanger 110, which is dry), the higher the dew point of the hydrogen-containing gas that passes through the joint (junction) between the anode gas supply path 29 and the downstream end of the bypass path 116. In this way, the hydrogen system 200 according to this embodiment ensures the dew point of the hydrogen-containing gas supplied to the anode AN is set to an appropriate level according to the temperature of the cell in the electrochemical hydrogen compressor 100.

Except for the described features, the hydrogen system 200 according to this embodiment may be the same as the hydrogen system 200 according to Embodiment 1 or the example of Embodiment 1.

EXAMPLE

The hydrogen system 200 according to this example is the same as the hydrogen system 200 according to Embodiment 2 except for the control the controller 50 provides, which is described below.

The controller 50 controls the flow regulator 115 to increase the flow rate of the hydrogen-containing gas through the bypass path 116 when there is an increase in the temperature of the cell including the electrolyte membrane 11, the anode AN, and the cathode CA.

By virtue of this, the hydrogen system 200 according to this example ensures, through the control of the flow rate of the hydrogen-containing gas through the bypass path 116 with its flow regulator 115, that the dew point of the hydrogen-containing gas supplied to the anode AN is increased to an appropriate level as the temperature of the cell in the electrochemical hydrogen compressor 100 rises.

At start-up, for example, the temperature of the electrochemical hydrogen compressor 100 is usually equal to room temperature. In that case, for instance, the flow rate of the hydrogen-containing gas that goes to the heat exchanger 110 is made faster than that of the hydrogen-containing gas through the bypass path 116. This causes a less humidified hydrogen-containing gas to be supplied to the anode AN in the electrochemical hydrogen compressor 100 than with the opposite relationship between the flow rates of the hydrogen-containing gases, helping reduce the risk of flooding at the anode AN.

To take another example, in operation, the temperature of the cell in the electrochemical hydrogen compressor 100 increases with the time of operation of the electrochemical hydrogen compressor 100 because of latent heat produced when the steam in the hydrogen-containing gas condenses and of the heat resulting from an IR loss proportional to the electric current that flows through the electrolyte membrane 11. In that case, for example, the flow rate of the hydrogen-containing gas that goes to the heat exchanger 110 is made slower than that of the hydrogen-containing gas through the bypass path 116. This causes a more humidified hydrogen-containing gas to be supplied to the anode AN in the electrochemical hydrogen compressor 100 than with the opposite relationship between the flow rates of the hydrogen-containing gases, helping reduce the risk of drying up at the electrolyte membrane 11.

The temperature of the cell in the electrochemical hydrogen compressor 100 may be detected with any suitable temperature sensor (not illustrated), such as a thermocouple or thermistor, or may be detected using a parameter that correlates with the temperature of the cell in the electrochemical hydrogen compressor 100. An example of such a parameter is, as mentioned above, the time of operation of the electrochemical hydrogen compressor 100.

Except for the described features, the hydrogen system 200 according to this example may be the same as the hydrogen system 200 according to any of Embodiment 1, the example of Embodiment 1, or Embodiment 2.

Embodiment 3

Figure 6:
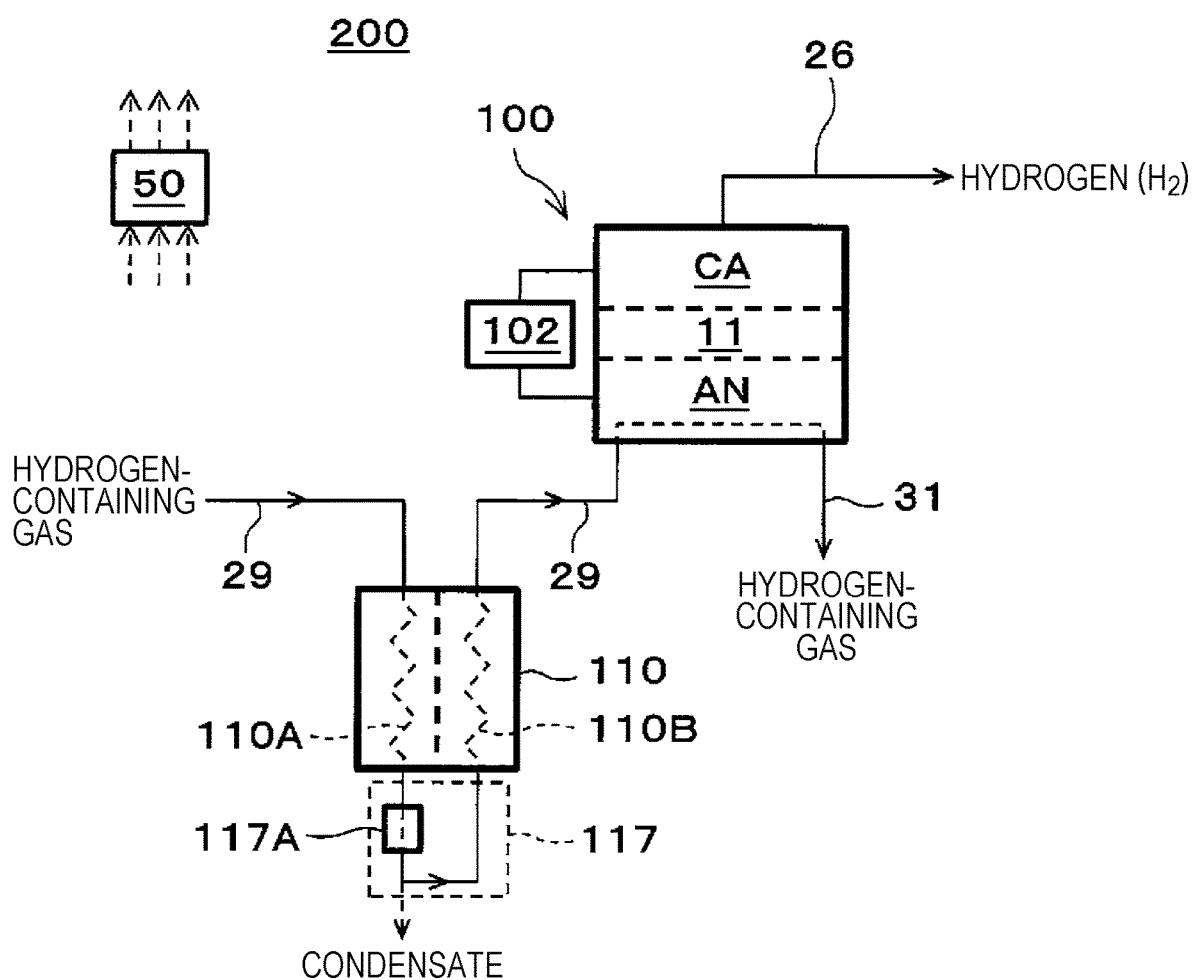
FIG. 6 is a diagram illustrating an example of a hydrogen system according to Embodiment 3.

FIG. 6 is a diagram illustrating an example of a hydrogen system according to Embodiment 3.

In the example illustrated in FIG. 6, the hydrogen system 200 includes an electrochemical hydrogen compressor 100, a heat exchanger 110, an anode gas supply path 29, a cooling mechanism 117, and a controller 50.

The electrochemical hydrogen compressor 100 and the heat exchanger 110 are the same as in Embodiment 1.

The cooling mechanism 117 includes a cooler 117A that cools the hydrogen-containing gas flowing through the anode gas supply path 29. That is, the cooler 117A is a device that cools the hydrogen-containing gas that has passed through the primary flow channel 110A of the heat exchanger 110 and has yet to flow into the secondary flow channel 110b of the heat exchanger 110. Specifically, the cooler 117A is in the anode gas supply path 29 between the gas outlet of the primary flow channel 110A of the heat exchanger 110 and the gas inlet of the secondary flow channel 110b of the heat exchanger 110.

The cooler 117A can be in any form as long as it is a device having a cooling function whereby it cools the hydrogen-containing gas specified above. For example, the cooler 117A may be a heat sink, for example having heat-radiating fins. The heat-radiating fins may be, for example, on piping forming the anode gas supply path 29 not covered with a thermal insulator. The cooler 117A may be, for instance, an air cooler or may be a cooler that uses a coolant. The former type of cooler has, for example, cooling fans or cooling fins. The latter type of cooler has, for example, a flow channel component through which the coolant flows. The coolant can be, for example, cooling water or water plus antifreeze.

The controller 50 controls the cooler 117A to make the power of the cooler 117A the desired amount.

The controller 50 may control the overall operation of the hydrogen system 200. The controller 50 can be in any form as long as it has a control function. For example, the controller 50 includes a processor and a data storage that stores a control program. Examples of processors include an MPU and a CPU. An example of a data storage is a memory. The controller 50 may be a single controller that provides centralized control, or may be a set of multiple controllers that work together to provide distributed control.

Even after the hydrogen-containing gas has been dehumidified through the heat exchanger 110 and the cooling mechanism 117, the steam therein can condense at the anode AN as long as the humidity is too high for the temperature of the cell in the electrochemical hydrogen compressor 100. In that case, therefore, flooding caused by condensate can occur at the anode AN. For example, if the anode gas supply path 29 is cooled by the ambient air at the cooling mechanism 117, the dehumidification of the hydrogen-containing gas by the cooling mechanism 117 can be insufficient depending on the relative magnitudes of the external temperature and the temperature of the hydrogen-containing gas. To take another example, in wintertime, compared with summertime, the dehumidification of the hydrogen-containing gas by the heat exchanger 110 and the cooling mechanism 117 can be insufficient because the temperature of the cell in the electrochemical hydrogen compressor 100 tends to be low at start-up.

To address this, the hydrogen system 200 according to this embodiment further includes a cooler 117A as described above. The cooler 117A helps further cool and dehumidify the hydrogen-containing gas that has been dehumidified through the heat exchanger 110 and the cooling mechanism 117. The hydrogen system 200 according to this embodiment, therefore, is prevented effectively from flooding caused by condensate, for example at start-up in wintertime.

Except for the described features, the hydrogen system 200 according to this embodiment may be the same as the hydrogen system 200 according to any of Embodiment 1, the example of Embodiment 1, Embodiment 2, or the example of Embodiment 2.

EXAMPLE

The hydrogen system 200 according to this example is the same as the hydrogen system 200 according to Embodiment 3 except for the control the controller 50 provides, which is described below.

The controller 50 reduces the power of the cooler 117A when there is an increase in the temperature of the cell including the electrolyte membrane 11, the anode AN, and the cathode CA.

By virtue of this, the hydrogen system 200 according to this example ensures, through the control of the power of the cooler 117A, that the dew point of the hydrogen-containing gas supplied to the anode AN is increased to an appropriate level as the temperature of the cell in the electrochemical hydrogen compressor 100 rises.

At start-up, for example, the temperature of the electrochemical hydrogen compressor 100 is usually equal to room temperature. In that case, for instance, the power of the cooler 117A is not reduced. This causes a less humidified hydrogen-containing gas to be supplied to the anode AN in the electrochemical hydrogen compressor 100 than reducing the power of the cooler 117A, helping reduce the risk of flooding at the anode AN.

To take another example, in operation, the temperature of the cell in the electrochemical hydrogen compressor 100 increases with the time of operation of the electrochemical hydrogen compressor 100 because of latent heat produced when the steam in the hydrogen-containing gas condenses and of the heat resulting from an IR loss proportional to the electric current that flows through the electrolyte membrane 11. In that case, for example, the power of the cooler 117A is reduced. This causes a more humidified hydrogen-containing gas to be supplied to the anode AN in the electrochemical hydrogen compressor 100 than not reducing the power of the cooler 117A, helping reduce the risk of drying up at the electrolyte membrane 11.

The temperature of the cell in the electrochemical hydrogen compressor 100 may be detected with any suitable temperature sensor (not illustrated), such as a thermocouple or thermistor, or may be detected using a parameter that correlates with the temperature of the cell in the electrochemical hydrogen compressor 100. An example of such a parameter is, as mentioned above, the time of operation of the electrochemical hydrogen compressor 100.

Except for the described features, the hydrogen system 200 according to this example may be the same as the hydrogen system 200 according to any of Embodiment 1, the example of Embodiment 1, Embodiment 2, the example of Embodiment 2, or Embodiment 3.

Embodiment 4

Figure 7:
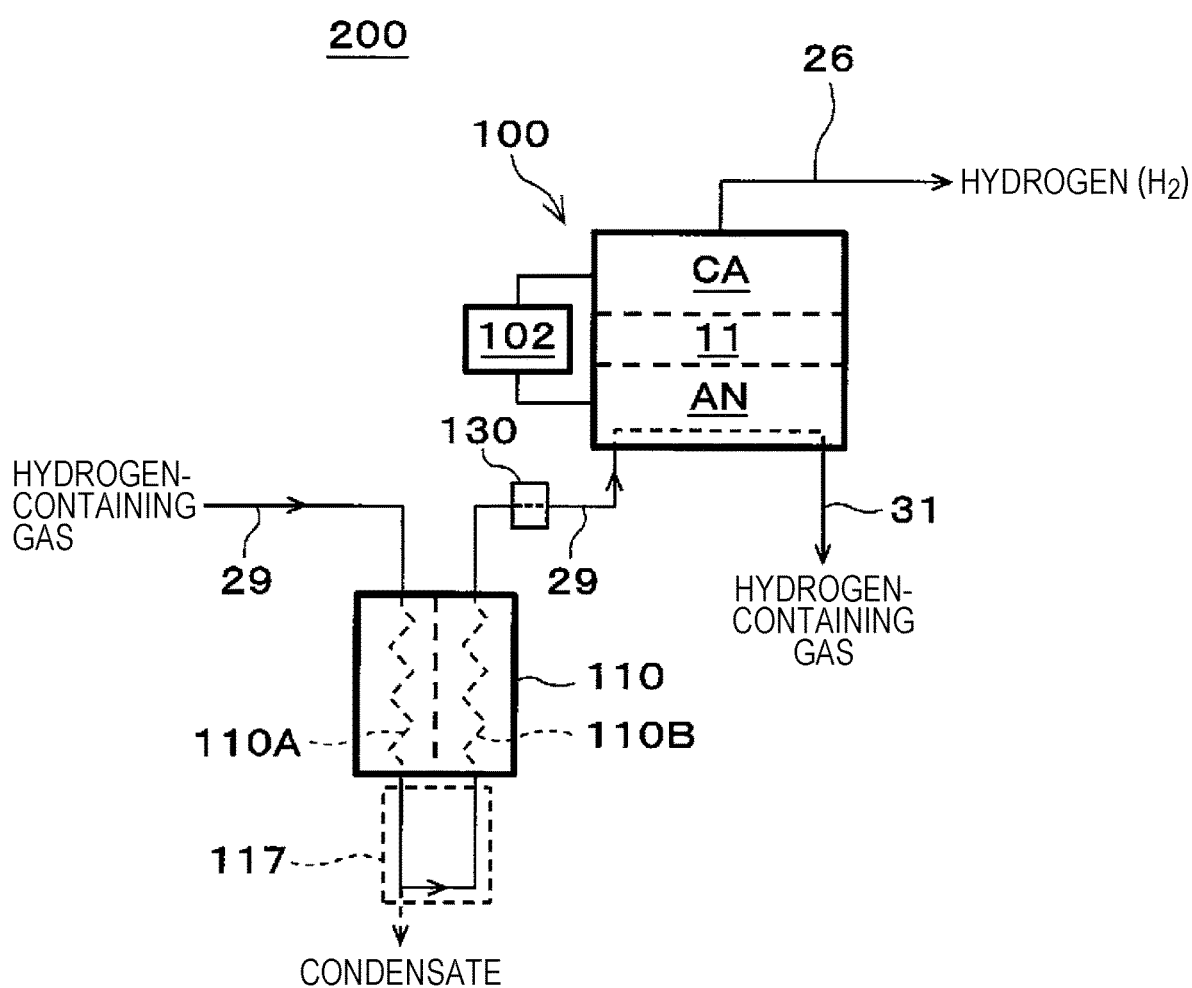
FIG. 7 is a diagram illustrating an example of a hydrogen system according to Embodiment 4.

FIG. 7 is a diagram illustrating an example of a hydrogen system according to Embodiment 4.

In the example illustrated in FIG. 7, the hydrogen system 200 includes an electrochemical hydrogen compressor 100, a heat exchanger 110, an anode gas supply path 29, a cooling mechanism 117, and a heater 130.

The electrochemical hydrogen compressor 100, cooling mechanism 117, and heat exchanger 110 are the same as in Embodiment 1. In the example illustrated in FIG. 7, therefore, the anode gas supply path 29 is cooled by the ambient air at the cooling mechanism 117.

The heater 130 is a device that is in the anode gas supply path 29 and further heats the hydrogen-containing gas that has been heated through the heat exchanger 110.

The heater 130 can be in any form as long as such a hydrogen-containing gas can be heated therewith. For example, the heater 130 may be an electrical heating device or may be a heat-exchange heating device that uses any suitable heat medium.

By virtue of these, the hydrogen system 200 according to this embodiment allows the temperature of the hydrogen-containing gas to be increased to an appropriate level using the heater 130. The cell in the electrochemical hydrogen compressor 100, therefore, can be heated to its desired temperature effectively with the heat of the hydrogen-containing gas, and, as a result, hydrogen compression by the electrochemical hydrogen compressor 100 becomes more efficient.

Except for the described features, the hydrogen system 200 according to this embodiment may be the same as the hydrogen system 200 according to any of Embodiment 1, the example of Embodiment 1, Embodiment 2, the example of Embodiment 2, Embodiment 3, or the example of Embodiment 3.

Embodiment 1, the example of Embodiment 1, Embodiment 2, the example of Embodiment 2, Embodiment 3, the example of Embodiment 3, and Embodiment 4 may be combined unless mutually exclusive.

To those skilled in the art, many improvements to and other embodiments of the present disclosure are apparent from the foregoing description. The foregoing description should therefore be construed only as an illustration and is provided in order to teach those skilled in the art the best mode of carrying out the present disclosure. The details of the structures and/or functions set forth herein can be substantially changed without departing from the spirit of the present disclosure.

INDUSTRIAL APPLICABILITY

An aspect of the present disclosure is applicable to hydrogen systems that can make hydrogen compression by an electrochemical hydrogen compressor more efficient than it is now.

What is claimed is:

1. A hydrogen system comprising:
a compressor that includes an electrolyte membrane, an anode on a first primary surface of the electrolyte membrane, a cathode on a second primary surface of the electrolyte membrane, and a voltage applicator that applies a voltage between the anode and the cathode, the compressor producing compressed hydrogen by causing the voltage applicator to apply a voltage between the anode and the cathode to move hydrogen in hydrogen-containing gas containing steam supplied to the anode to the cathode via the electrolyte membrane;
a supply path through which the hydrogen-containing gas containing steam to be supplied to the anode from a hydrogen source outside the compressor flows;
a cooling mechanism disposed in the supply path; and
a heat exchanger disposed in the supply path, the heat exchanger exchanging heat between the hydrogen-containing gas flowing through the supply path upstream of the cooling mechanism and the hydrogen-containing gas flowing through the supply path downstream of the cooling mechanism.

2. The hydrogen system according to claim 1, further comprising a bypass path that branches from the supply path, bypasses the heat exchanger, and then joins the supply path.

3. The hydrogen system according to claim 2, further comprising: a flow regulator that regulates a flow rate of the hydrogen-containing gas flowing through the bypass path; and a controller that controls the flow regulator to increase the flow rate of the hydrogen-containing gas flowing through the bypass path when there is an increase in temperature of a cell including the electrolyte membrane, the anode, and the cathode.

4. The hydrogen system according to claim 1, wherein the cooling mechanism includes a heat sink that cools the hydrogen-containing gas flowing through the supply path.

5. The hydrogen system according to claim 4, further comprising a controller that reduces power of the cooler when there is an increase in temperature of a cell including the electrolyte membrane, the anode, and the cathode.

6. The hydrogen system according to claim 1, further comprising a heater, in the supply path, that further heats the hydrogen-containing gas that has been heated through the heat exchanger.

7. The hydrogen system according to claim 1, wherein a water electrolyzer produces the hydrogen-containing gas supplied to the anode.

8. The hydrogen system according to claim 1, wherein the hydrogen-containing gas supplied to the anode, includes a reformed gas produced by steam reforming or autothermal reforming of a feedstock including an organic compound made up of carbon and hydrogen.

9. The hydrogen system according to claim 1, wherein the cooling mechanism includes a coolant that cools the hydrogen-containing gas flowing through the supply path.

* * * * *